United States Patent
Hintze-Brüning et al.

(10) Patent No.: US 6,180,180 B1
(45) Date of Patent: Jan. 30, 2001

(54) AQUEOUS TWO-COMPONENT POLYURETHANE COATING AGENT, PROCESS FOR ITS PRODUCTION, ITS USE AS A FINISHING COATING MATERIAL OR CLEAR COATING MATERIAL, AND ITS USE FOR COATING PLASTICS

(75) Inventors: Horst Hintze-Brüning; Peter Rink, both of Münster; Egbert Nienhaus, Ascheberg, all of (DE)

(73) Assignee: BASF Coatings AG, Muenster-Hiltrup (DE)

( * ) Notice: Under 35 U.S.C. 154(b), the term of this patent shall be extended for 0 days.

(21) Appl. No.: 09/142,924

(22) PCT Filed: Mar. 7, 1997

(86) PCT No.: PCT/EP97/01164

§ 371 Date: Oct. 7, 1998

§ 102(e) Date: Oct. 7, 1998

(87) PCT Pub. No.: WO97/35898

PCT Pub. Date: Oct. 2, 1997

(30) Foreign Application Priority Data

Mar. 25, 1996 (DE) .............................. 196 11 646

(51) Int. Cl.$^7$ ................. B05D 1/36; C08J 3/02; C08K 3/20
(52) U.S. Cl. ............. 427/407.1; 524/457; 524/501; 524/507; 524/555; 524/591
(58) Field of Search ............... 427/407.1, 409, 427/388.4; 524/457, 501, 507, 555, 591; 526/301, 302

(56) References Cited

U.S. PATENT DOCUMENTS

| | | | |
|---|---|---|---|
| 4,318,833 | * | 3/1982 | Guagliardo ............ 524/457 |
| 4,558,090 | * | 12/1985 | Drexler et al. .......... 427/407.1 |
| 4,663,201 | * | 5/1987 | House et al. ............ 427/388.2 |
| 4,719,132 | * | 1/1988 | Porter, Jr. ............. 427/407.1 |
| 4,861,825 | * | 8/1989 | Ernst et al. ............ 524/839 |
| 4,977,207 | * | 12/1990 | Hoefer et al. .......... 524/507 |
| 5,342,882 | * | 8/1994 | Gobel et al. ........... 524/832 |
| 5,387,642 | * | 2/1995 | Blum et al. ............ 427/372.2 |
| 5,658,617 | * | 8/1997 | Gobel et al. ........... 427/388.4 |
| 5,747,166 | * | 5/1998 | Schwarte et al. ........ 427/388.4 |
| 5,760,128 | * | 6/1998 | Baltus et al. .......... 427/388.4 |
| 5,834,555 | * | 11/1998 | Meisenburg et al. ..... 524/591 |

FOREIGN PATENT DOCUMENTS

| | | |
|---|---|---|
| 38 05 629 C1 | 2/1988 | (DE) . |
| 42 26 270 A1 | 8/1992 | (DE) . |
| 44 21 823 A1 | 6/1994 | (DE) . |
| 4 32 66 70 A1 | 2/1995 | (DE) . |
| 0 634 431 A1 | 7/1994 | (EP) . |
| 0 678 536 A1 | 4/1995 | (EP) . |

* cited by examiner

Primary Examiner—Diana Dudash

(57) ABSTRACT

The present invention relates to an aqueous two-component polyurethane coating composition comprising a component (I) wich contains as binder (A1) at least one water-soluble or water-dispersible polyester resin (A1) which contains hydroxyl groups and acid groups which can be converted into the corresponding acid anion groups and has an OH number of from 30 to 250 mg of KOH/g and an acid number of from 5 to 150 mg of KOH/g, and (A2) at least one water-soluble or water-dispersible polyurethane resin (A2) which contains hydroxyl groups and acid groups which can be converted into the corresponding acid anion groups and has an OH number of from 20 to 200 mg of KOG/g and an acid number of from 5 to 150 mg of KOH/g, and (A3) at least one water-soluble or water-dispersible acrylate copolymer which contains hydroxyl groups and acid groups which can be converted into the corresponding acid anion groups, and/or an acrylated polyester and/or an acrylated polyurethane, which has an OH number of from 40 to 200 mg of KOG/g and an acid number of from 5 to 150 mg of KOH/g, and (A4), if desired, at least one further polymer (A4) and II) a component (II) which contains a polyisocyanate component (F1) as crosslinking agent, wherein the mixing ratio of the polyester resin (A1) to the polyurethane resin (A2), expressed in parts by weight, is between 95:5 and 5:95.

22 Claims, No Drawings

AQUEOUS TWO-COMPONENT POLYURETHANE COATING AGENT, PROCESS FOR ITS PRODUCTION, ITS USE AS A FINISHING COATING MATERIAL OR CLEAR COATING MATERIAL, AND ITS USE FOR COATING PLASTICS

BACKGROUND AND SUMMARY OF THE INVENTION

The present invention relates to an aqueous two-component polyurethane coating composition comprising
I.) a component (I) which contains as binder (A)
 (A1) at least one water-soluble or water-dispersible polyester resin (A1) which contains hydroxyl groups and acid groups which can be converted into the corresponding acid anion groups and has an OH number of from 30 to 250 mg of KOH/g and an acid number of from 5 to 150 mg of KOH/g, and
 (A2) at least one water-soluble or water-dispersible polyurethane resin (A2) which contains hydroxyl groups and acid groups which can be converted into the corresponding acid anion groups and has an OH number of from 20 to 200 mg of KOH/g and an acid number of from 5 to 150 mg of KOH/g, and
 (A3) at least one water-soluble or water-dispersible acrylate copolymer which contains hydroxyl groups and acid groups which can be converted into the corresponding acid anion groups, and/or an acrylated polyester and/or an acrylated polyurethane, which has an OH number of from 40 to 200 mg of KOH/g and an acid number of from 5 to 150 mg of KOH/g, and (A4) if desired, at least one further polymer (A4) and
II.) a component (II) which contains a polyisocyanate component (F1) as crosslinking agent.

The present invention also relates to a process for preparing these aqueous coating compositions and to their use as a clearcoat or as a topcoat and to their use for coating plastics.

For ecological and economic reasons, the paint industry is seeking to replace the amount of organic solvents used in paints as far as possible by water. Aqueous coating compositions are already in use not only in the area of automotive line coating but also in the area of automotive repair finishes. In the area of plastic coating, too, it is increasingly desirable to use aqueous systems, not only in the area of primers but also in the area of topcoats.

Topcoats are understood to mean paints which are used for producing the uppermost paint coat. The uppermost paint coat can be a single-coat or multicoat system, in particular a two-coat system. Two-coat topcoats consist of a pigmented basecoat layer and a clearcoat layer applied on top of the basecoat layer, which clearcoat layer is unpigmented or pigmented only with transparent pigments. Nowadays two-coat paints are produced by the wet-in-wet method in which a pigmented basecoat is precoated and the resulting basecoat layer, without being subjected to a baking step, is overcoated with a clearcoat, and basecoat layer and clearcoat layer are then jointly cured. This method is very advantageous in terms of economics, but it makes high demands on the basecoat and the clearcoat. The clearcoat applied on top of the not yet cured basecoat must not dissolve the basecoat layer on the surface or interfere in any other way since this would lead to paints having poor appearance. This is in particular true of paints in which basecoats containing effect pigments (for example metallic pigments, in particular aluminum flakes, or nacreous pigments) are used.

In the area of plastic coating an additional requirement is that the resulting coatings should have high flexibility while exhibiting high moisture resistance (for example low permeability). Furthermore, the coatings should have good appearance. This means that the coatings exhibit, for example, high gloss and that the coating compositions show good flow properties. Furthermore the coatings should possess good adhesion. In addition, component (I) of the coating composition should have a long shelf life.

In the area of plastic coating, an additional requirement is that the coating compositions used can be cured at low temperatures (in general below 100° C.) and give films having the desired properties even when cured at these low temperatures.

DE-A-4,421,823 discloses aqueous polyurethane coating compositions consisting of at least three components where the component (I) contains at least one binder dissolved in organic solvent, which binder is selected from the group consisting of polyester resins, polyurethane resins, polyacrylate resins and, if desired, of further binders; component (II) contains at least one uncapped polyisocyanate as crosslinking agent; and component (III) is essentially free of binder and contains water. The coating compositions are prepared by mixing the three components a short time before applying the coating compositions. These coating compositions are used, in particular, in the area of automotive repair finishes.

However, these coating compositions disclosed in DE-A-4,421,823 have the disadvantage that their preparation is quite expensive since three different components have to be stored and mixed with one another a short time before applying the coating compositions. Furthermore, this coating composition contains a binder component which has been predissolved in an organic solvent, this solvent being also present in the coating composition prepared from the three components.

Furthermore, DE-A-4,326,670 discloses aqueous two-component polyurethane coating compositions based on an aqueous dispersion of at least one binder having a number-average molecular weight of 1000 to 100,000 and containing groups which are reactive towards isocyanate groups, calculated on the basis of an OH number of 20 to 250 and an acid number of 10 to 100, the acid functions of which are at least in part neutralized, and of a polyisocyanate as crosslinking agent. Examples of suitable binders include polyacrylate resins, polyester resins, polyurethane resins or (meth)acrylated polyester resins or (meth)acrylated polyurethane resins.

DE-A-4,326,670 does not describe the use of a mixture of at least one polyester and at least one polyurethane resin and of at least one polyacrylate resin or an acrylated polyester and/or an acrylated polyurethane as binder. The coating compositions disclosed in DE-A-4,326,670 have the disadvantage that their shelf life is not sufficiently long.

Accordingly, the object of the present invention is to provide aqueous two-component polyurethane coating compositions which are suitable for coating plastic substrates, in particular in the area of the production of topcoats. The resulting coatings should have, in particular, high elasticity while exhibiting high moisture resistance (for example low permeability). Furthermore, the coating compositions should meet the requirements usually demanded of coating compositions which are used for coating plastic substrates. Accordingly, the coating compositions should, for example, also give coatings having good appearance (good gloss, good flow properties, and the like) and good adhesion. Furthermore, component (I) of the coating composition should have a long shelf life.

Finally, the coating compositions should be curable at low temperatures (in general below 100° C.) and should give films having the desired properties even when cured at these low temperatures.

Surprisingly, this object is achieved by means of the coating compositions of the type mentioned at the beginning, wherein the mixing ratio of the polyester resin (A1) to the polyurethane resin (A2) is between 95 parts by weight of polyester resin: 5 parts by weight of polyurethane resin and 5 parts by weight of polyester resin: 95 parts by weight of polyurethane resin.

The present invention also provides a process for preparing these coating compositions and relates to the use of the coating compositions as topcoat or clearcoat and to their use for coating plastics.

It is surprising and was not foreseeable that the use of a mixture of at least one polyacrylate resin and/or acrylated polyester and/or acrylated polyurethane resin and at least one polyester resin and at least one polyurethane resin as binder would result in aqueous two-component polyurethane coating compositions which give coatings which, not only with respect to flexibility but also simultaneously with respect to moisture resistance, have improved properties compared with coatings prepared by using at least one polyacrylate resin and/or acrylated polyester and/or acrylated polyurethane resin and either at least one polyester resin or at least one polyurethane resin.

An additional advantage is that the coating compositions according to the invention result in coatings having good appearance and good adhesion. Furthermore, component (I) of the coating composition exhibits a long shelf life, and the coating compositions show good application performance. Finally, the coating compositions are curable at low temperatures (in general below 100° C.) and lead to films having the desired properties even when cured at these low temperatures.

DETAILED DESCRIPTION OF THE INVENTION

Below, first the individual components of the coating compositions according to the invention are described in more detail.

It is essential to the invention that the coating composition contains as binder a mixture of at least one polyacrylate resin and/or one acrylated polyester and/or one acrylated polyurethane resin and at least one water-soluble or water-dispersible polyester resin (A1) and at least one water-soluble or water-dispersible polyurethane resin (A2), the mixing ratio of the polyester resin (A1) to the polyurethane resin (A2) being between 95 parts by weight of polyester resin: 5 parts by weight of polyurethane resin and 5 parts by weight of polyester resin: 95 parts by weight of polyurethane resin. Preferred coating compositions are obtained if the mixing ratio of polyester resin (A1) to polyurethane resin (A2) is between 90 parts by weight of polyester resin: 10 parts by weight of polyurethane resin and 30 parts by weight of polyester resin 70 parts by weight of polyurethane resin, particularly preferably between 75 parts by weight of polyester resin: 25 parts by weight of polyurethane resin and 50 parts by weight of polyester resin: 50 parts by weight of polyurethane resin.

Suitable polyester resins (A1) for preparing the coating compositions according to the invention are all water-soluble or water-dispersible polyester resins (A1) which contain hydroxyl groups and acid groups which can be converted into the corresponding acid anion groups, which polyester resins have an OH number of from 30 to 250 mg of KOH/g, particularly preferably of from 60 to 200 mg of KOH/g, and an acid number of from 5 to 150 mg of KOH/g, preferably of from 15 to 75 mg of KOH/g, and particularly preferably of from 20 to 50 mg of KOH/g. Polyester resins (A1) preferably have number-average molecular weights Mn of between 500 and 30,000 Dalton, preferably of between 1000 and 10,000 Dalton, and particularly preferably of between 1000 and 5000 Dalton, in each case measured against a polystyrene standard. It is preferred to use branched polyesters.

Preferably, those polyesters are used which are obtainable by reacting p1) di- and/or polycarboxylic acids or esterifiable derivatives thereof, if desired together with monocarboxylic acids, p2) diols, p3) polyolols, if desired together with monools, and p4) if desired further modifying components.

Of these, polyesters which have been prepared without using monools and monocarboxylic acids are particularly preferably used. Polyesters which are free of unsaturated fatty acids are also particularly preferred.

Examples of polycarboxylic acids which can be used as component (p1) include aromatic, aliphatic and cycloaliphatic polycarboxylic acids. Preferably, aromatic and/or aliphatic polycarboxylic acids are used as component (p1).

Examples of suitable polycarboxylic acids are phthalic acid, isophthalic acid, terephthalic acid, halophthalic acid, such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and others. The cycloaliphtatic [sic] polycarboxylic acids can be used either in their cis or in their trans form and as a mixture of both forms. The esterifiable derivatives of the abovementioned polycarboxylic acids, such as, for example, mono- or polyesters thereof with aliphatic alcohols having 1 to 4 carbon atoms or hydroxyalcohols having 1 to 4 carbon atoms, are also suitable. In addition, the anhydrides of the abovementioned acids, if they exist, can also be used.

Examples of monocarboxylic acids which, if desired, can be used together with the polycarboxylic acids, are benzoic acid, tert-butylbenzoic acid, lauric acid, isononanoic acid and hydrogenated fatty acids of naturally occurring oils, preferably isononanoic acid.

Examples of suitable diols (p2) for preparing the polyester (A2) are ethylene glycol, propanediols, butanediols, hexanediols, neopentylglycol hydroxypivalate, neopentylglycol, diethylene glycol, cyclo-hexanediol, cyclohexanedimethanol, trimethylpentanediol and ethylbutylpropanediol. Furthermore, aliphatic polyether diols, such as linear or branched poly(oxyethylene) glycols, poly(oxypropylene) glycols and/or poly(oxybutylene) glycols, and mixed polyether diols, such as poly(oxyethyleneoxypropylene) glycols, are also suitable. The polyether diols usually have a molecular weight Mn of 400 to 3000.

Furthermore, the diols used can also be aromatic or alkylaromatic diols, such as, for example, 2-alkyl-2-phenylpropane-1,3-diol, bisphenol derivatives having ether functionality, and the like.

Further suitable diols include esters of hydroxycarboxylic acids with diols where the abovementioned diols can be used as the diol. Examples of hydroxycarboxylic acids are hydroxypivalic acid or dimethylolpropanoic acid.

Examples of polyols which are suitable as component (p3) are ditrimethylolpropane, trimethylolethane, trimethylolpropane, glycerol, pentaerythritol, homopentaerythritol, dipentaerythritol, tris(hydroxyethyl) isocyanate, 1,2,4 butanetriol [sic], propane- and hexanetriols, trihydroxycarboxylic acids, such as tris (hydroxymethyl)(ethyl)ethanoic acids. Polyols having at least 3 OH groups can be used on their own or as a mixture. If desired, the triols can be used together with monohydric alcohols, such as, for example, butanol, octanol, lauryl alcohol, cyclohexanol, tert-butylcyclohexanol, ethoxylated and propoxylated phenols.

Suitable components (p4) for preparing the polyesters (A1) are in particular compounds containing a group which is capable of reacting with the functional groups of the polyester. Their modifying components (p4) used can be diepoxide compounds, if desired also monoepoxide compounds. Examples of suitable components (p4) are described in DE-A-4,024,204 on page 4, lines 4 to 9.

Suitable components (p4) for preparing the polyesters (A1) include compounds which also contain, in addition to a group which is capable of reacting with the functional groups of the polyester (A1), a tertiary amino group, for example monoisocyanates containing at least one tertiary amino group or mercapto compounds containing at least one tertiary amino group. For details, see DE-A-4,024,204, page 4, lines 10 to 49.

Polyesters (A1) are prepared by the known esterification methods, such as described, for example, in DE-A-4,024, 204, page 4, lines 50 to 65.

This reaction is usually carried out at temperatures of between 180 and 280° C., if desired in the presence of a suitable esterification catalyst, such as, for example, lithium octoate, dibutyltin oxide, dibutyltin dilaurate, para-toluenesulfonic acid, and the like. The preparation of the polyesters (A1) is usually carried out in the presence of small amounts of a suitable solvent which is used as entrainer. Examples of the entrainer used are aromatic hydrocarbons, such as, in particular, xylene and (cyclo) aliphatic hydrocarbons, for example cyclohexane. However, another alternative is to prepare the polyesters in the absence of solvents (solvent-free reaction)

Particularly preferably, the components (A1) used are polyesters which have been prepared by a two-step process by first preparing a hydroxyl-containing polyester having an OH number of from 100 to 400 mg of KOH/g, preferably of from 150 to 350 mg of KOH/g, and an acid number of less than 10 mg of KOH/g and a number-average molecular weight Mn of from 500 to 2000 Dalton which is then reacted in a second step with carboxylic anhydrides to give the desired polyester (A1). The amount of carboxylic anhydrides is selected such that the polyester obtained has the desired acid number. Suitable acid anhydrides are those which are usually used for this reaction, such as, for example, hexahydrophthalic anhydride, trimellitic anhydride, pyromellitic anhydride, phthalic anhydride, camphoric anhydride, tetrahydrophthalic anhydride, succinic anhydride and mixtures of these and/or other anhydrides and, in particular, anhydrides of aromatic polycarboxylic acids, such as trimellitic anhydride.

Apart from being reacted with carboxylic anhydrides, the acid groups can furthermore also be incorporated in the polyester by using dimethylolpropionic acid and the like.

The polyurethane resins (A2) used for preparing the coating compositions according to the invention include any polyurethane resins (A2) which contain water-soluble or water-dispersible hydroxyl groups and acid groups which can be converted into the corresponding acid anion groups and have an OH number of from 20 to 200 mg of KOH/g, preferably of from 80 to 180 mg of KOH/g, and an acid number of from 5 to 150 mg of KOH/g, in each case relative to the solid resin. Preferably, the polyurethane resins used are those having a number-average molecular weight Mn of between 1000 and 30,000 Dalton, preferably of between 1000 and 15,000 Dalton, and particularly preferably of between 1000 and 7500 Dalton, in each case measured against a polystyrene standard.

Suitable polyurethane resins are described, for example, in the following publications: EP-A-355,433, DE-A-3,545, 618, DE-A-3,813,866, DE-A-3,210,051, DE-A-2,624,442, DE-A-3,739,332, U.S. Pat. No. 4,719,132, EP-A-89,497, U.S. Pat. No. 4,558,090, U.S. Pat. No. 4,489,135, DE-A-3, 628,124, EP-A-158,099, DE-A-2,926,584, EP-A-195,931, DE-A-3,321,180 and DE-A-4,005,961.

The polyurethane resins which can be used in component (I) are those which are preparable by reacting isocyanato-containing prepolymers with compounds which are capable of reacting with isocyanate groups.

The isocyanato-containing prepolymers can be prepared by reacting polyols having a hydroxyl number of from 10 to 1800, preferably from 50 to 1200, mg of KOH/g with excess polyisocyanates at temperatures of up to 150° C., preferably 50 to 130° C., in organic solvents which are incapable of reacting with isocyanates. The equivalent ratio of NCO to OH groups is between 2.0:1.0 and >1.0:1.0, preferably between 1.4:1 and 1.1:1.

The polyols used for preparing the prepolymer can be of low molecular weight and/or of high molecular weight and contain inert anionic groups or groups capable of forming anions or cationic groups or groups which are capable of forming cations. The additional use of low-molecular-weight polyols having a molecular weight of from 60 to 400 Dalton for preparing the isocyanato-containing prepolymers is also possible. The amounts of polyols used can be up to 30% by weight, preferably about 2 to 20% by weight, relative to the total amount of polyol components.

To obtain an NCO prepolymer of high flexibility, a large amount of a predominantly linear polyol having a preferred OH number of from 30 to 150 mg of KOH/g should be added. Up to 97% by weight of the total amount of polyol can consist of saturated and unsaturated polyesters and/or polyethers having a number-average molecular weight Mn of from 400 to 5000 Dalton. The polyether diols selected should not introduce excessive amounts of ether groups since otherwise the polymers formed will be subject to swelling in water. Polyester diols are prepared by esterifying organic dicarboxylic acids or anhydrides thereof with organic diols or are derived from a hydroxycarboxylic acid or from a lactone. Branched polyester polyols can be prepared by using small amounts of polyols or polycarboxylic acids having a relatively high number of hydroxyl or carboxyl groups.

The NCO prepolymer contains at least about 0.5% by weight of isocyanate groups, preferably at least 1% by weight of NCO, relative to solids. The upper limit is about 15% by weight, preferably 10% by weight, particularly preferably 5% by weight of NCO.

However, the compounds which are preferably used are polyurethane resins (A2) which are available by reacting in a first reaction step (a) at least one organic di- and/or polyisocyanate with
(b) at least one compound containing at least one group which is capable of reacting with isocyanate groups and at least one group which ensures water dispersibility, preferably one group which is capable of forming anions,
to give a reaction product having free isocyanate groups which is then reacted with
(c) a polycondensation product comprising
(k1) 10 to 45 mol % of at least one diol,
(k2) 5 to 50 mol % of at least one polyol having at least 3 OH groups per molecule,
(k3) 35 to 47 mol % of at least one di- and/or polycarboxlic acid, if desired together with a monocarboxylic acid, and
(k4) 0 to 20 mol % of at least one monool, the sum of the mol % of the components (k1) to (k4) being in each case 100 mol %, and
(d) 0 to 20 mol %, relative to component c, of further alcohol components
to give the polyurethane resin (A2), the amounts of components (a) to (d) being selected such that the polyurethane resin has the desired OH numbers and acid numbers and, if desired, the desired molecular weights.

Particularly preferred polyurethane resins are obtained by using components (k1), (k2), (k3) and (k4) in such molar ratios that the sum of the OH building blocks (k1), (k2) and (k4) combined and the sum of the COOH building blocks (k4) are used [sic] in the ratio of 0.8:1 to 1.6:1.

The relative amounts of components (a) to (d) can be selected to vary over wide ranges and as a function of the reaction components. If polyester component (c) does not contain any hydrophilic segments, such as polyether portions, it is preferred to react up to 1.1 mol of polyester (c) per mole of NCO equivalent to give an OH/NCO ratio of >1. If a polymeric polyester containing hydrophilic segments is used, it is also possible to use more than 1.1 mol of polyester (c) per NCO equivalent.

Suitable multifunctional isocyanates for preparing the polyurethane resins include aliphatic, cycloaliphatic and/or aromatic polyisocyanates containing at least two isocyanate groups per molecule. Preference is given to isomers or mixtures of isomers of organic diisocyanates. Owing to their good resistance to UV light, (cyclo)aliphatic diisocyanates yield products of low tendency to yellowing. The polyisocyanate component needed for forming the polyurethane resin can also contain a proportion of polyisocyanates of higher valence, provided this does not lead to gel formation. Triisocyanates which have successfully been employed are those products which are obtained by trimerization or oligomerization of diisocyanates or by reaction of diisocyanates with polyfunctional compounds containing OH or NH groups. If desired, the average functionality can be lowered by adding monoisocyanates.

Examples of polyisocyanates which can be used are phenylene diisocyanate, toluylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate trimethylene diisocyanate, tetramethylene diisocyanate, pentamethylene diisocyanate, hexamethylene diisocyanate, propylene diisocyanate, ethylethylene diisocyanate and trimethylhexane diisocyanate.

High-solid polyurethane resin solutions are prepared by using, in particular, diisocyanates of the general formula (III')

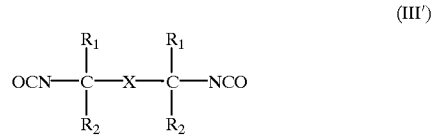

where X is a divalent aromatic hydrocarbon radical, preferably an unsubstituted or halo-, methyl- or methoxy-substituted naphthylene, diphenylene or 1,2-, 1,3- or 1,4-phenylene radical, particularly preferably a 1,3-phenylene radical, and $R_1$ and $R_2$ are an alkyl radical having 1–4 carbon atoms, preferably a methyl radical. Diisocyanates of the formula (III') are known (their preparation is described, for example, in EP-A-101,832, U.S. Pat. No. 3,290,350, U.S. Pat. No. 4,130,577 and U.S. Pat. No. 4,439,616), and are in part commercially available (1,3-bis)l-isocyanatoprop-2-yl) benzene is sold, for example, by the American Cyanmid [sic] Company under the trade name TMXDI (META)®). Further preferred polyisocyanate components are diisocyanates of the formula (IV'):

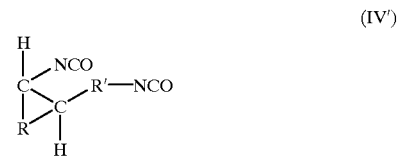

where R is a divalent alkyl or aralkyl radical having 3 to 20 carbon atoms and R' is a divalent alkyl or aralkyl radical having 1 to 20 carbon atoms.

In general, polyurethanes are not compatible with water unless specific components have been incorporated during the synthesis and/or specific preparative steps have been carried out. Thus, the compounds used for preparing not only the preferred polyurethane resins prepared by the abovementioned two-step process but also for preparing other polyurethane resins used as component (A2) are those containing at least one group which is capable of reacting with isocyanate groups and at least one group which ensures water dispersibility. Suitable groups of this type are nonionic groups (e.g. polyethers), anionic groups, mixtures of these two groups or cationic groups.

Thus, it is preferred to incorporate in the polyurethane resin an acid number sufficient for dispersing the neutralized product in water to give a stable dispersion. The compounds used for this purpose are those containing at least one group which is capable of reacting with isocyanate groups and at least one group which is capable of forming anions. Suitable groups which are capable of reacting with isocyanate groups are in particular hydroxyl groups and primary and/or secondary amino groups. Groups which are capable of forming anions are carboxyl, sulfonic acid and/or phosphonic acid groups. Preferably, alkanoic acids containing two substituents on the alpha-carbon atom are used. The substituent can be a hydroxyl group, an alkyl group or an alkylol group. These polyols one, contain at least usually 1 to 3, carboxyl groups per molecule. They contain two to about 25, preferably 3 to 10, carbon atoms. Very particular preference is given to using dimethylolpropanoic acid. The carboxyl-containing polyol can make up to 1 to 25% by weight, preferably 1 to 20% by weight, of the total amount of polyol components in the polyurethane resin (A2).

The amount of ionizable carboxyl groups available in salt form as a result of the neutralization of the carboxyl groups is usually at least 0.4% by weight, preferably at least 0.7% by weight, relative to solids. The upper limit is about 12% by weight. The amount of dihydroxyalkanoic acids in the unneutralized prepolymer gives an acid number of at least 5 mg of KOH/g, preferably at least 10 mg of KOH/g. If the acid numbers are very low, further measures for achieving water dispersibility are usually necessary. The upper limit of the acid number is 150 mg of KOH/g, preferably 40 mg of KOH/g, relative to solids. The acid number is preferably in the range of from 20 to 40 mg of KOH/g.

As for the compounds (k1) to (k4) which are suitable for preparing the polycondensation product (c) and as for the reaction conditions used in their preparation, see the description of the polyester resins (A1).

The polycondensation products (c) which are preferably used are those having an OH number of from 100 to 400 mg of KOH/g, preferably of from 150 to 300 mg of KOH/g, an acid number of from 0 to 50 mg of KOH/g, preferably of from 0 to 30 mg of KOH/g, and particularly preferably of 1 to 20 mg of KOH/g, in each case relative to the solid resin, and a number-average molecular weight Mn of between 500 and 15,000 Dalton, preferably of between 1000 and 10,000 Dalton, in each case measured against a polystyrene standard.

Examples of alcohol components which are suitable as further modifying components (d) are monoalcohols, such as nonanol and decanol, and reaction products of monocarboxylic acids with epoxides. Preferably, the components (d) are compounds having on average more than 1 OH group per molecule.

The polyurethane resins can be prepared by the known methods (e.g. acetone method). Alternatively, the components can also be reacted in ethoxyethyl propionate (EEP) as solvent. The amount of ethoxyethyl propionate can vary over a wide range and should be sufficient for obtaining a prepolymer solution of suitable viscosity. In general, up to 70% by weight, preferably 5 to 50% by weight, and particularly preferably less than 20% by weight, of solvent, relative to solids, are used. Thus, for example, it is particularly preferred to carry out the reaction at a solvent content of 10–15% by weight of EEP, relative to solids.

If desired, the reaction of the components can be carried out in the presence of a catalyst, such as organotin compounds and/or tertiary amines.

The coating compositions according to the invention contain as component (A3) at least one water-soluble or water-dispersible acrylate copolymer which contains hydroxyl groups and acid groups which can be converted into the corresponding acid anion groups and/or one acrylated polyester and/or one acrylated polyurethane having an OH number of from 40 to 200 mg of KOH/g and an acid number of from 5 to 150 mg of KOH/g.

The acrylate copolymers used as component (A3) preferably have number-average molecular weights of between 1000 and 30,000 Dalton, preferably of between 1000 and 15,000 Dalton, in each case measured against a polystyrene standard.

Acrylate copolymers which are suitable as acrylate copolymer (A3) containing hydroxyl groups and acid groups include all those having the OH numbers, acid numbers and molecular weights mentioned.

Acrylate copolymers which are preferably used as component (A3) are those which are obtainable by polymerization of a1) a (meth)acrylate which is different from (a2), (a3), (a4), (a5) and (a6), copolymerizable with (a2), (a3), (a4), (a5) and (a6) and substantially free of acid groups or a mixture of such monomers, a2) an ethylenically unsaturated monomer which is copolymerizable with (a1), (a3), (a4), (a5) and (a6), different from (a5) and carries at least one hydroxyl group per molecule and is substantially free of acid groups, or a mixture of such monomers, a3) an ethylenically unsaturated monomer which carries, per molecule, at least one acid group which can be converted into the corresponding acid anion group, and is copolymerizable with (a1), (a2), (a4), (a5) and (a6), or a mixture of such monomers, and a4) if desired one or more vinyl esters of alpha-branched monocarboxylic acids having 5 to 18 carbon atoms per molecule, and/or a5) if desired at least one reaction product of acrylic acid and/or methacrylic acid with the glycidyl ester of an alpha-branched monocarboxylic acid having 5 to 18 carbon atoms per molecule or, instead of the reaction product, an equivalent amount of acrylic and/or methacrylic acid which is then reacted, during or after the polymerization reaction, with the glycidyl ester of an alpha-branched monocarboxylic acid having 5 to 18 carbon atoms per molecule, a6) if desired an ethylenically unsaturated monomer which is copolymerizable with (a1), (a2), (a3), (a4) and (a5), is different from (a1), (a2), (a4) and (a5) and is substantially free of acid groups, or a mixture of such monomers in an organic solvent or a solvent mixture and in the presence of at least one polymerization initiator, type and amount of (a1), (a2), (a3), (a4), (a5) and (a6) being selected such that polyacrylate resin (A3) has the desired OH number, acid number and the desired molecular weight.

In order to prepare the polyacrylate resins used according to the invention, the component (a1) used can be any (meth)acrylic ester which is coplymerizable with (a2), (a3), (a4), (a5) and (a6) and is substantially free of acid groups or a mixture of such (meth)acrylic esters. Examples include alkyl acrylates and alkyl methacrylates having up to 20 carbon atoms in the alkyl radical, such as, for example, methyl acrylate and methacrylate, ethyl acrylate and methacrylate, propyl acrylate and methacrylate, butyl acrylate and methacrylate, hexyl acrylate and methacrylate, ethylhexyl acrylate and methacrylate, stearyl acrylate and methacrylate and lauryl acrylate and methacrylate, and cycloaliphatic (meth)acrylic esters, such as, for example, cyclohexyl (meth)acrylate, isobornyl (meth)acrylate, dicyclopentaene [sic] (meth)acrylate and tert-butylcyclohexyl (meth)acrylate.

The component (a1) used can also be ethyltriglycol (meth)acrylate and methoxyoligoglycol (meth)acrylate having a number-average molecular weight Mn of, preferably, 550 Dalton or other ethoxylated and/or propoxylated hydroxyl-free (meth)acrylic acid derivatives.

The compounds which are used as component (a2) can be ethylenically unsaturated monomers which are copolymerizable with (a1), (a2), (a3), (a4), (a5) and (a6), are different from (a5), carry at least one hydroxyl group per molecule and are substantially free of acid groups, or can be a mixture of such monomers. Examples include hydroxyalkyl esters of acrylic acid, methacrylic acid or any other alpha,beta-ethylenically unsaturated carboxylic acid. These esters can be derived from an alkylene glycol which is esterified with the acid or they can be obtained by reacting the acid with an alkylene oxide. The compounds which are used as component (a2) are preferably hydroxyalkyl esters of acrylic acid or methacrylic acid in which the hydroxyalkyl group contains up to 20 carbon atoms, reaction products of cyclic esters, such as, for example, epsilon-caprolactone, with these hydroxyalkyl esters, or mixtures of these hydroxyalkyl esters or of hydroxyalkyl esters modified with epsilon-caprolactone.

Examples of such hydroxyalkyl esters include 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, hydroxystearyl acrylate and hydroxystearyl methacrylate. The corresponding esters of other unsaturated acids, such as, for example, ethacrylic acid, crotonic acid and similar acids having up to about 6 carbon atoms per molecule, can also be used.

Furthermore olefinically unsaturated polyols can also be used as component (a2). Preferred polyacrylate resins (A3) are obtained by using trimethylolpropane monoallyl ether at least in part as component (a2). The proportion of trimethylolpropane monoallyl ether is usually 2 to 10% by weight, relative to the total weight of the monomers (a1) to (a6) used for preparing the polyacrylate resin. However, in addition to this, it is also possible to add 2 to 10% by weight of trimethylolpropane monoallyl ether, relative to the total weight of the monomers used for preparing the polyacrylate resin, to the finished polyacrylate resin. The olefinically unsaturated polyols, such as, in particular, trimethylolpropane monoallyl ether, can be used as the only hydroxyl-containing monomers, but are used in particular proportionately in a combination with others of the hydroxyl-containing monomers mentioned.

The component (a3) used can be any ethylenically unsaturated monomer which carries at least one acid group, preferably a carboxyl group, per molecule and is copolymerizable with (a1), (a2), (a4), (a5) and (a6), or a mixture of such monomers. The component (a3) used is particularly preferably acrylic acid and/or methacrylic acid. However, other ethylenically unsaturated carboxylic acids having up to 6 carbon atoms in the molecule can also be used. Examples of such acids include ethacrylic acid, crotonic acid, maleic acid, fumaric acid and itaconic acid. Furthermore, for example, ethylenically unsaturated sulfonic or phosphonic acids or partial esters thereof can be used as component (a3). Mono(meth)acryloyloxyethyl maleate, mono(meth)acryloyloxyethyl succinate and mono(meth)acryloyloxyethyl phthalate can also be used as component (a3).

The component (a4) used includes one or more vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acid catalyst. The olefins can be products obtained by cracking paraffinic hydrocarbons, such as mineral oil fractions, and can contain not only branched but also straight-chain acyclic and/or cylcoaliphatic olefins. The reaction of such olefins with formic acid or with carbon monoxide and water produces a mixture of carboxylic acids in which the carboxyl groups are predominantly attached to a quaternary carbon atom. Examples of other olefinic starting materials are propylene trimer, propylene tetramer and diisobutylene. However, the vinyl esters can also be prepared from the acids in the manner known per se, for example by reacting the acid with acetylene.

Owing to their ready availability, it is particularly preferred to use vinyl esters of saturated aliphatic monocarboxylic acids which contain 9 to 11 carbon atoms and are branched on the alpha-carbon atom.

The compound which is used as component (a5) is the reaction product of acrylic acid and/or methacrylic acid with the glycidyl ester of an alpha-branched monocarboxylic acid having 5 to 18 carbon atoms per molecule. Glycidyl esters of highly branched monocarboxylic acids are available under the trade name "Cardura". The reaction of the acrylic or methacrylic acid with the glycidyl ester of a carboxylic acid having a tertiary alpha-carbon atom can take place before, during or after the polymerization reaction. Preferably, the component (a5) used is the reaction product of acrylic and/or methacrylic acid with the glycidyl ester of versatic acid. This glycidyl ester is commercially available under the name "Cardura E10".

The compounds which can be used as component (a6) include any ethylenically unsaturated monomers which are copolymerizable with (a1), (a2), (a3), (a4) and (a5), are different from (a1), (a2), (a3) and (a4) and are substantially free of acid groups, or mixtures of such monomers. Preferably, vinylaromatic hydrocarbons, such as styrene, alpha-alkylstyrenes and vinyltoluene, are used as component (a6).

The compounds which can be used as component (a6) include polysiloxane macromonomers in combination with other monomers mentioned as being suitable as component (a6). Suitable polysiloxane macromonomers are those having a number-average molecular weight Mn of from 1000 to 40,000, preferably of from 2000 to 10,000 Dalton and on average 0.5 to 2.5, preferably 0.5 to 1.5, of ethylenically unsaturated double bonds per molecule. Examples of suitable polysiloxane macromonomers are those described in DE-A 3,807,571 on pages 5 to 7, in DE-A 3,706,095 in columns 3 to 7, in EP-B 358,153 on pages 3 to 6 and in U.S. Pat. No. 4,754,014 in columns 5 to 9. Furthermore, other vinyl monomers containing acryloxysilane and having the abovementioned molecular weights and contents of ethylenically unsaturated double bonds, for example compounds obtainable by reacting hydroxy functional silanes with epichlorohydrin, followed by reacting the reaction product with methacrylic acid and/or hydroxyalkyl esters of (meth) acrylic acid, are also suitable.

Preferably, the polysiloxane macromonomers mentioned in DE-A 4,421,823 are used as component (a6).

Examples of polysiloxane macromonomers which are suitable as component (a6) include the compounds mentioned in the international patent application, application number WO 92/22615 on page 12, line 18, to page 18, line 10.

The amount of the polysiloxane macromonomer(s) (a6) used for modifying the acrylate copolymers (A1) is less than 5% by weight, preferably 0.05 to 2.5% by weight, particularly preferably 0.05 to 0.8% by weight, in each case relative to the total weight of the monomers used for preparing copolymer (A3).

By using such polysiloxane macromonomers, the slip of the aqueous coating compositions according to the invention is improved.

Particularly preferably used acrylate resins are obtained by polymerization of (a1) 20 to 60% by weight, preferably 30 to 50% by weight, of component (a1), (a2) 10 to 40% by weight, preferably 15 to 35% by weight, of component (a2), (a3) 1 to 15% by weight, preferably 2 to 8% by weight, of component (a3), (a4) 0 to 25% by weight, preferably 5 to 15% by weight, of component (a4), (a5) 0 to 2ir by weight, preferably 5 to 15% by weight, of component (a5), and (a6) 5 to 30% by weight, preferably 10 to 20% by weight, of component (a6), the sum of the weight proportions of components (a1) to (a6) being in each case 100% by weight.

The preparation of the polyacrylate resins (A3) used according to the invention is carried out in an organic solvent or solvent mixture and in the presence of at least one polymerization initiator. The organic solvents and polymerization initiators used are the solvents and polymerization initiators customary for preparing polyacrylate resins and suitable for preparing aqueous dispersions. The solvents used can participate in the reaction with the crosslinking component (II) and thus act as reactive diluent.

Examples of useful solvents are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate and 3-methyl-3-methoxybutanol and derivatives based on propylene glycol, for example ethyl ethoxypropionate, isopropoxypropanol, methoxypropyl acetate and the like. Alternatively, the polyacrylate resins (A3) can also be prepared first in a solvent which is not water-dilutable and then, if desired, to replace this solvent after polymerization in part by a water-dilutable solvent.

Examples of useful polymerization initiators include free-radical initiators, such as, for example, tert-butylperoxyethyl hexanoate, benzoyl peroxide, azobisisobutyronitrile and tert-butyl perbenzoate. Preferably, the initiators are used in an amount of 2 to 25% by weight, particularly preferably in an amount of 4 to 10% by weight, relative to the total weight of the monomers.

Polymerization is advantageously carried out at a temperature of from 80 to 160° C., preferably from 110 to 160° C. Preferably, the solvents used are n-butanol, ethoxyethyl propionate and isopropoxypropanol.

Polyacrylate resin (A3) is preferably prepared by a two-step process since in this way the resulting aqueous coating compositions exhibit better processability. Accordingly, it is preferred to use polyacrylate resins which are obtainable by 1. polymerizing a mixture of (a1), (a2), (a4), (a5) and (a6) or a mixture of portions of components (a1), (a2), (a4), (a5) and (a6) in an organic solvent,
2. adding, after at least 60% by weight of the mixture comprising (a1), (a2), (a4), (a5) and, if present, (a6) have been added, (a3) and any remainder of components (a1), (a2), (a4), (a5) and (a6) and continuing polymerization, and
3. after completion of the polymerization, neutralizing the resulting polyacrylate resin, if desired, at least in part, i.e. converting the acid groups into the corresponding acid anion groups.

However, it is also possible to introduce first components (a4) and/or (a5) together with at least a portion of the solvent and then to meter in the remaining components. Another possibility is to introduce components (a4) and/or (a5) only in part together with at least a portion of the solvent into the reaction vessel and to add the remainder of these components as described above. It is preferred to introduce first, for example, at least 20% by weight of the solvent and about 10% by weight of components (a4) and (a5) and, if desired, portions of components (a1) and (a6). Preference is also given to preparing the polyacrylate resins (A3) used according to the invention by a two-step process in which step (I) has a duration of 1 to 8 hours, preferably of 1.5 to 4 hours, and the mixture comprising (a3) and any remainder of components (a1), (a2), (a4), (a5) and (a6) is added over a period of 20 to 120 minutes, preferably over a period of 30 to 90 minutes. After addition of the mixture comprising (a3) and any remainder of components (a1), (a2), (a4), (a5) and (a6) is complete, polymerization is continued until conversion of all monomers used is essentially complete.

The amount and rate of addition of the initiator is preferably selected such that a polyacrylate resin (A3) having the desired number-average molecular weight is obtained. It is preferred to start the initiator feed some time, in general about 15 minutes, before the monomer feed. Preference is furthermore given to a process in which addition of the initiator is started at the same time as addition of the monomers and is completed about half an hour after addition of the monomers has been completed. The initiator is preferably added in a constant amount per unit of time. After addition of the initiator is complete, the reaction mixture is maintained at the polymerization temperature for a time (usually 1.5 hours) sufficient for essentially complete conversion of all monomers used. "Essentially complete conversion" is understood as meaning that preferably 1000 by weight of monomers used have been converted and that, however, it is also possible that a small residual monomer content of not more than about 0.50% by weight, relative to the weight of the reaction mixture, may remain unconverted.

Preferably, the monomers for preparing polyacrylate resins (A3) are polymerized at a polymerization solids content which is not excessively high, preferably at a polymerization solids content of 80 to 50% by weight, and the solvents are then in part removed by distillation to give polyacrylate resin solutions having a solids content of, preferably, 80 to 60% by weight.

Suitable components (A3) are furthermore acrylated polyesters having an OH number of from 40 to 200 mg of KOH/g, particularly preferably of from 60 to 160 mg of KOH/g, and an acid number of from 5 to 150 mg of KOH/g, preferably of from 15 to 75 mg of KOH/g, and particularly preferably of from 20 to 50 mg of KOH/g. The acrylated polyesters (A3) preferably have number-average molecular weights Mn of between 1000 and 50,000 Dalton, preferably of between 1000 and 15,000 Dalton, in each case measured against a polystyrene standard. The acrylated polyesters which are used as component (A3) are known. Suitable acrylated polyesters (A3) can be prepared by various processes known to one skilled in the art, for example by incorporating trimethylolpropane monoallyl ether or maleic anhydride or other reactive anhydrides which are polymerizable with styrene and/or (meth)acrylates, followed by acrylation (organic or aqueous).

Suitable components (A3) furthermore include acrylated polyurethanes having an OH number of from 40 to 200 mg of KOH/g, particularly preferably of from 60 to 160 mg of KOH/g, and an acid number of from 5 to 150 mg of KOH/g, preferably of from 15 to 75 mg of KOH/g, and particularly preferably of from 20 to 50 mg of KOH/g. The acrylated polyurethanes (A3) preferably have number-average molecular weights Mn of between 1000 and 50,000 Dalton, preferably of between 1000 and 15,000 Dalton, in each case measured against a polystyrene standard. The acrylated polyurethanes which are used as component (A3) are also known. Examples of suitable acrylated polyurethanes are described, for example, in DE-A-4,122,265, page 2, line 15, to page 5, line 44, in DE-A-4,010,176, page 2, line 41, to page 6, line 64, in EP-A-308,115, page 2, line 29, to page 5, line 21, in EP-A-510,572, page 3, line 21, to page 5, line 42, and in U.S. Pat. No. 4,496,708, column 4, line 5, to column 12, line 46.

Suitable components (A4) include any polymers which are compatible with the remaining constituents of component (I). For example, the di- and/or polyisocyanates mentioned as examples of suitable crosslinking agents can be used in capped form as (A4). Illustrative examples of capping agents for the di- and/or polyisocyanates mentioned include aliphatic, cycloaliphatic or aralipatic monoalcohols, such as, for example, methyl alcohol, butyl alcohol, octyl alcohol, lauryl alcohol, cyclohexanol or phenylcarbinol, hydroxylamines, such as ethanolamine, oximes, such as methyl ethyl ketone oxime, acetone oxime or cyclohexanone oxime, amines, such as dibutylamine or diisopropylamine, malonic diesters, ethyl acetoacetate and/or epsilon-caprolactam.

Component (I) preferably contains as binder (A) a mixture of 10 to 50% by weight of the mixture of at least one polyester (A1) and at least one polyurethane resin (A2), 50 to 90% by weight of at least one polyacrylate resin (A3) and/or of at least one acrylated polyester resin and/or of at least one acrylated polyurethane resin and 0 to 10% by weight of at least one further polymer (A4), the sum of the weight proportions of the components being in each case 100% by weight.

Furthermore, it is preferable to use binders (A) (i.e. the mixture of components (A1) to (A4)) which have an OH number of from 50 to 200, preferably of from 80 to 180, mg of KOH/g.

The component (I) can contain as further constituent (B) any pigments customary for paints in amounts of 0 to 60% by weight, relative to component I. The pigments can be composed of inorganic or organic compounds and can be effect pigments and/or coloring pigments.

Effect pigments which can be used include metal flake pigments, such as commercially available aluminum bronzes, aluminum bronzes chromated in accordance with DE-A-3,363,183, and commercially available stainless steel bronzes and non-metallic effect pigments, such as, for example, nacreous or interference pigments. Examples of suitable inorganic coloring pigments are titanium dioxide, iron oxides, Sicotrans yellow and carbon black. Examples of suitable organic coloring pigments are indanthrene blue, Cromophtal red, Irgazine orange and Heliogene green.

Component (I) and also the binder can contain as further constituent (C) at least one organic partially or completely water-soluble solvent. Such solvents can also participate in the reaction with crosslinking component (II) and thus act as reactive diluent. Examples of suitable solvents are the compounds already mentioned for the preparation of the polyacrylate resins (A3) (see above). Further suitable solvents are esters, ketones, keto esters, glycol ether esters and glycol ethers, for example ethylene glycol and 1,2- and 1,3-propylene glycol.

Furthermore, solvents (C) can entirely or in part consist of lower-molecular-weight oligomeric compounds which may be capable of reacting with crosslinking component (II) or else may also be incapable of reacting with them. Solvents (C) are usually used in an amount of 0 to 20% by weight, preferably in an amount of less than 15% by weight, relative to the total weight of component (I).

Component (I) usually contains as constituent (D) at least one neutralizing agent. Examples of suitable neutralizing agents are ammonia, ammonium salts, such as, for example, ammonium carbonate or ammonium bicarbonate, and amines, preferably tertiary amines, such as, for example, trimethylamine, triethylamine, tributylamine, dimethylaniline, diethylaniline, triphenylamine, dimethylethanolamine, diethylethanolamine, methyldiethanolamine, triethanolamine, and the like. The neutralizaing agent used is particularly preferably dimethylethanolamine.

The overall amount of neutralizing agent used in the coating composition according to the invention is selected such that 1 to 100 equivalents, preferably 50 to 90 equivalents, of acid groups of the binder (A) are neutralized.

Component (I) can contain as constituent (E) at least one rheology-regulating additive. Examples of rheology-regulating additives include crosslinked polymer microparticles, such as disclosed, for example, in EP-A-38,127, inorganic layer silicates, such as, for example, aluminum magnesium silicates, sodium magnesium layer silicates and sodium magnesium fluorine lithium layer silicates of the montmorillonite type, and synthetic polymers containing ionic and/or associative groups, such as polyvinyl alcohol, poly(meth)acrylamide, poly(meth)acrylic acid, polyvinylpyrrolidone, styrene/maleic anhydride copolymers or ethylenelmaleic anhydride copolymers and derivatives thereof or else hydrophobically modified ethoxylated urethanes or polyacrylates. Preferably, the rheology-regulating additives used are polyurethanes. Component (I) preferably contains 0 to 2.0% by weight of the rheology-regulating additive, relative to the total weight of component (I).

In addition, component (I) can contain at least one further customary paint additive. Examples of such additives are defoamers, dispersing aids, emulsifiers and flow-control agents.

Finally, component (I) additionally contains water. Paint component (II) contains as crosslinking agent at least one di- and/or polyisocyanate (F1) which may or may not be dissolved in one or more organic solvent or may or may not be dispersed in water-dilutable solvents and is preferably uncapped.

The polyisocyanate component (F1) can be any organic polyisocyanate containing aliphatically, cycloaliphatically, araliphatically and/or aromatically bonded free isocyanate groups. Preferably, the polyisocyanates used have 2 to 5 isocyanate groups per molecule and viscosities of from 100 to 2000 mPas (at 23° C). If desired, small amounts of organic solvent, preferably 1 to 25% by weight, relative to the pure polyisocyanate, can be added to the polyisocyanates to improve the incorporability of the isocyanate and, if desired, to lower the viscosity of the polyisocyanate to a value within the abovementioned ranges. Examples of solvents for the polyisocyanates which are suitable as additives are ethoxyether propionate, butyl acetate, and the like.

Examples of suitable isocyanates are described, for example, in "Methoden der organischen Chemie" (Methods of organic chemistry), Houben-Weyl, Volume 14/2, 4th Edition, Georg Thieme Verlag, Stuttgart 1963, pp. 61 to 70, and by W. Siefken, Liebigs Ann. Chem. 562, 75 to 136. Suitable isocyanates are, for example, the isocyanates mentioned in the description of the polyurethane resins (A2) and/or isocyanato-containing polyurethane prepolymers which can be obtained by reaction of polyols with excess polyisocyanate and are preferably of low viscosity.

It is also possible to use polyisocyanates which contain isocyanurate groups and/or biuret groups and/or allophanate groups and/or urethane groups and/or urea groups and/or uretdione groups. Polyisocyanates which contain urethane groups are obtained, for example, by reacting a portion of the isocyanate groups with polyols, such as, for example, trimethylolpropane and glycerol.

Preferably, the isocyanates used are aliphatic or cycloaliphatic polyisocyanates, in particular hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate or mixtures of these polyisocyanates. Very particular preference is given to using mixtures of polyisocyanates which are based on hexamethylene diisocyanate and contain uretdione and/or isocyanurate groups and/or allophanate groups, as obtained by catalytic oligomerization of hexamethylene diisocyanate in the presence of suitable catalysts. Incidentally, the polyisocyanate component (F1) can also comprise any desired mixtures of the polyisocyanates mentioned by way of example.

Advantageously, polyisocyanate component (F1) is used in the coating compositions according to the invention in such an amount that the ratio of the hydroxyl groups of binder (A) to the isocyanate groups of crosslinking agent (F1) is between 1:2 and 2:1, particularly preferably between 1:1 and 1:1.5.

The two components (I) and (II) of the coating composition according to the invention are prepared from the individual constituents with stirring using customary methods. The preparation of the coating composition from these two components (I) and (II) is likewise effected by stirring or dispersing using the customarily used apparatuses, for example using dissolvers or the like or using the likewise customarily used 2-component metering and blending unit or using the method for preparing aqueous 2-component polyurethane coatings described in DE-A-19,510,651, page 2, line 62, to page 4, line 5.

The aqueous coatings prepared using the binders according to the invention usually contain in their ready-to-use state 30 to 80, preferably 45 to 70, % by weight of water, 0 to 50, preferably 0 to 20, % by weight of organic solvents, 6 to 70, preferably 15 to 70, % by weight of binder (A) according to the invention, preferably 0 to 25% by weight of pigments and/or fillers and 0 to 10% by weight of other additives, such as, for example, catalysts, thickeners, flow-control agents, and the like, their percentages by weight given being based on the entire formulation of the coatings in the ready-to-use state (i.e., for example with respect to their spray viscosity).

The aqueous coatings prepared using the binders according to the invention can be used for coating primed or unprimed plastics, such as, for example, ABS, AMMA, ASA, CA, CAB, EP, UF, CF, MF, MPF, PF, PAN, PA, PC, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1). The plastics to be coated can of course also be polymer blends, modified plastics or fiber-reinforced plastics. The coating compositions according to the invention are preferably used for coating PPE/PA blends, polycarbonate blends (e.g. PC/ASA, PC/PBT) and polypropylene blends. The coating compositions according to the invention are used in particular for plastics customarily used in the construction of vehicles, in particular in the construction of motorized vehicles.

Non-functionalized and/or non-polar substrate surfaces have to be subjected to a pretreatment, such as plasma or flame, prior to coating.

Suitable primers include any customary primers, not only conventional primers but also aqueous primers. It is of course also possible to use radiation-curable primers and radiation-curable aqueous primers.

The coating compositions according to the invention are used for producing a single-layer or multi-layer coating and preferably as topcoats. However, they can also be used as a clearcoat on top of a basecoat, for example as a clearcoat of a multi-layer coating prepared by the wet-in-wet method. It is of course also possible to coat the plastics or the other substrates directly with the clearcoat or the topcoat.

Finally, the coating compositions can also be applied to other substrates, such as, for example, metal, wood or paper. They are applied by customary methods, for example spraying, knife-coating, dipping or brushing.

The coating compositions according to the invention are usually cured at temperatures of below 120° C., preferably at temperatures of at most 100° C. In special application forms of the coating compositions according to the invention, it is also possible to employ higher curing temperatures.

The coating compositions according to the invention are preferably used for producing topcoats. The coating compositions according to the invention can be used not only in line coating but also in repair finishes of automotive bodies. However, they are preferably used in the area of repair finishes and very particularly preferably in the coating of plastic parts.

Below, the invention is illustrated in more detail by means of exemplary embodiments. All parts given are parts by weight unless expressly stated otherwise.

1.1. Preparation of a dispersion of a polyester resin (A1)

7.43 kg of hexanediol, 25.72 kg of neopentyl glycol hydroxypivalate, 4.23 kg of trimethylolpropane, 16.99 kg of hexahydrophthalic anhydride, 0.016 kg of hydrated tin oxide and 2.529 kg of cyclohexane are weighed into a steel vessel suitable for polycondensation reactions, and the mixture is heated at a maximum product temperature of 220° C. for a time sufficiently long to reach an acid number of from 6 to 8 and an OH number of about 276. After the acid number has been reached, the mixture was cooled to 120° C., and 9.06 kg of trimellitic anhydride are added. Heating to no more than 160° C. is continued until reaching an acid number of 35. The mixture was then cooled to 80° C., and 8.15 kg of isopropoxypropanol were added. This was followed by adding at this temperature 2.62 kg of dimethylethanolamine. Finally, a dispersion was prepared having an acid number of 35 and a solids content of 35%, a dimethylethanolamine content of 1.83% and a solvent content of 6.29% by adding deionized water. The polyester resin (A1) had an OH number of 143 mg and an acid number of 36.4 mg of KOH/g, in each case relative to the solid resin.

1.2. Preparation of a dispersion of polyurethane resin (A2)
Polyester precursor

To prepare 1 kg of polyester, 128.9 g of neopentyl glycol, 318.9 g of neopentyl glycol hydroxypivalate, 166.0 g of trimethylolpropane, 205.5 g of isophthalic acid, 40 g of xylene and 254.3 g of hexhydrophthalic [sic] anhydride were weighed into a steel vessel suitable for polycondensation reactions, the mixture was continually heated up, and the water of condensation was removed continuously. As soon as the product had reached an acid number of 3, the reaction was stopped, and the mixture was cooled to 100° C. and partially dissolved with methyl ethyl ketone (MEK) until reaching a solids content of 80% (viscosity of the 50% solution in MEK 0.2 Pas.). The condensation product thus obtained had an OH number of 202 mg of KOH/g and an acid number of 3.5 mg of KOH/g, in each case relative to the solid resin.

Urethane-modified polyester dispersion 1:

488.4 g of meta-tetramethylxylylene diisocyanate, 134.1 g of dimethylolpropoinic [sic] acid and 568.0 g of methyl ethyl ketone are weighed into a steel vessel suitable for polyaddition reactions, and the mixture was heated to 80° C. At a constant isocyanate content of 7.4%, relative to the mixture used, the batch was cooled to 50° C., and 2110 g of the polyester solution were added. This was followed by heating to 80° C. At an isocyanate content of <0.1% and a viscosity of 3.6 dPas (10.3 in N-methylpyrolidone [sic]), the mixture was neutralized with 71.2 g of N,N-dimethylethanolamine. It is then diluted with water, and the organic solvent is removed in vacuo. Finally, it is brought to a solids content of 43% by adding deionized water. The pH of the dispersion was 6.8. The dispersion was speckle-free, homogenous and had a shelf life of at least 8 weeks at 50° C. The DMEA content was 1.42% and the solvent content 0.5%. The polyurethane resin had an OH number of 98 mg of KOH/g, an acid number of 26 mg of KOH/g and a number-average molecular weight of 1713, measured against a polystyrene standard and based on the solid resin.

1.3. Preparation of a dispersion of an acrylate resin (A3)

A 4 l steel reactor equipped with two monomer feeds, initiator feed, stirrer and reflux condenser was charged with 470 parts by weight of n-butanol as solvent component (B2) (water solubility WS: 9.0, evaporation rate ER: 33, boiling point b.p.: 118° C.), and the mixture is heated to 110° C. This was followed by addition of a solution of 36 parts by weight of tert-butylperoxyethyl hexanoate in 92.4 parts by weight of n-butanol (B2) at such a rate that addition is complete after 5.5 hours. At the same time at which addition of the tert-butylperoxyethyl hexanoate solution is started, addition of the mixture comprising (a1) to (a6):
(a1): 240 parts by weight of n-butyl methacrylate,
   209 parts by weight of methyl methacrylate,
   120 parts by weight of lauryl methacrylate (methacrylic ester 13 from Röhm GmbH),
(a2): 270 parts by weight of hydroxyethyl methacrylate and
(a6): 180 parts by weight of styrene
is also started. The mixture comprising (a1), (a2) and (a6) is added at such a rate that addition is complete after 5 hours.

3.5 hours after the first monomer feed was started, a second monomer feed is started which is completed jointly with the first monomer feed and consists of a mixture of monomer components (a2) and (a5):
(a2): 120 parts by weight of hydroxyethyl methacrylate and
(a5): 61 parts by weight of acrylic acid.

After addition of the tert-butylperoxyethyl hexanoate solution is complete, the reaction mixture is maintained at 120° C. for another 2 h. The resin solution is then cooled to 80° C. and neutralized with 63 parts by weight of dimethylethanolamine in 1379 parts by weight [lacuna] to a degree of neutralization of 85% within about 30 minutes.

The solvent (B) n-butanol is then removed by azeotropic distillation until not more than 1% by weight of (B), relative to the dispersion, can be detected by gas chromatography.

After distillation is complete, the dispersion is adjusted to the following final characteristic values by addition of deionized water:
acid number of the entire solid: 37.2 mg of KOH/g,
solids content (1 hour, 130° C.): 38.3%, pH: 7.40.
Dimethylethanolamine content: 2.11%
Solvent content: 0.52%

The acrylate resin (A3) thus prepared had a number-average molecular weight of 7772 Dalton and a weight-average molecular weight of 26,651, measured against a polystyrene standard, an OH number of about 140 mg of KOH/g and an acid number of 37.2 mg of KOH/g, in each case relative to the solid resin.

2. Preparation of the coating compositions from Examples 1 to 3 and from Comparative Examples 1 and 2

The coating compositions are prepared from the components listed in Table 1 by preparing first component (I) from components (K-I-1) through (K-I-15) and component (II) from components (K-I—1) through (K-II-2) in each case by mixing using a laboratory stirrer, then mixing components (I) and (II), and finally bringing the mixture to the viscosity mentioned by addition of water.

The coating compositions thus prepared are applied pneumatically to PP panels (dry film thickness 30–35 micrometers). The panels thus coated are baked at 90° C. for 45 minutes and then aged at 22° C. and 50% of relative humidity of air for 8 days. The free clearcoat films are then subjected to various tests. The test results of the coatings are summarized in Tables 2 and 3.

Furthermore, the coating compositions of Examples 1 to 3 are distinguished by very good optical properties (appearance). Moreover, components (I) of Examples 1 to 3 have a long shelf life of at least half a year at 23° C. or of at least 8 weeks at 40° C.

SUMMARY OF THE TEST RESULTS

Examples 1 to 3 show that by using a mixture of polyester resin and polyurethane resin as further binder result [sic] in coatings having high elasticity (high elongation at break values at a relatively high breaking force) while exhibiting low permeability.

TABLE 1

Composition of the coating compositions of Examples 1 to 3 and of Comparative Examples 1 and 2 in parts by weight

| | | Ex. 1 | Ex. 2 | Ex. 3 | Comp. 1 | Comp. 2 |
|---|---|---|---|---|---|---|
| PES (A1) | K-I-1 | 12.16 | 9.12 | 6.08 | 18.24 | — |
| PUR (A2) | K-I-2 | 4.95 | 7.42 | 9.90 | — | 14.85 |
| PAC (A3) | K-I-3 | 64.7 | 64.7 | 64.7 | 65.21 | 65.21 |
| BGA | K-I-4 | 4.899 | 4.899 | 4.899 | 4.899 | 4.899 |
| IPP | K-I-5 | 0.868 | 1.059 | 1.251 | 0.769 | 1.633 |
| PnB | K-I-6 | 3.267 | 3.267 | 3.267 | 3.267 | 3.267 |
| Water | K-I-7 | 5.452 | 5.827 | 6.200 | 3.909 | 6.439 |
| Dil. | K-I-8 | 1.955 | 1.955 | 1.955 | 1.955 | 1.955 |
| Emul. | K-I-9 | 0.652 | 0.652 | 0.652 | 0.652 | 0.652 |
| Wett. 1 | K-I-10 | 0.938 | 0.938 | 0.938 | 0.938 | 0.938 |
| Wett. 2 | K-I-11 | 0.078 | 0.078 | 0.078 | 0.078 | 0.078 |
| Flow-c. | K-I-12 | 0.078 | 0.078 | 0.078 | 0.078 | 0.078 |
| Light s. 1 | K-I-13 | 0.155 | 0.155 | 0.155 | 0.155 | 0.155 |
| Light s. 2 | K-I-15 | 0.271 | 0.271 | 0.271 | 0.271 | 0.271 |
| Sum | — | 100 | 100 | 100 | 100 | 100 |
| SC BI | — | 31.17 | 31.17 | 31.17 | 31.17 | 31.17 |
| SC (A1)/ SC (A2) | — | 2.000 | 1.000 | 0.500 | — | — |
| Isocyan. | K-II-1 | 21.60 | 21.38 | 21.16 | 21.96 | 20.73 |
| EEP | K-II-2 | 5.40 | 5.34 | 5.29 | 5.49 | 5.18 |
| Water viscos. | K-III | 15.00 | 15.00 | 15.00 | 15.00 | 15.00 |
| OH (SC)/ NCO (mol) | — | 0.717 | 0.717 | 0.717 | 0.717 | 0.717 |

Explanation of Table 1
PES (A1): Polyester dispersion (A1) described in 1.1
PUR (A2): Polyurethane dispersion (A2) described in 1.2
PAC (A3): Polyacrylate dispersion (A3) described in 1.3
BGA: 2-Butoxyethyl acetate
IPP: 1(2)-Isopropoxy-2(1)-propanol
PnB: 1(2)-Butoxy-2(1)-propanol
Dil.: 10% solution of a commercially available thickener based on polyglycol dialkyl ether in water
Emul.: Commercially available emulsifier based on polyglycol octylphenol ether
Wett. 1: Commercially available polyether-modified dimethyloligosiloxane
Wett. 2: Commercially available polyether-modified dimethylpolysiloxane Flow-c.: Commercially available flow-control agent based on a polyether-modified polysiloxane Light s. 1: Commercially available light stabilizer based on a sterically hindered amine (HALS)

Light s. 2: Commercially available light stabilizer based on benzotriazole

Isocyan.: Commercially available 100% pure isocyanate based on a hexamethylene diisocyanate allophanate having an NCO content of 20%

SC(BI): Solids content of the binder, sum of (A1)+(A2)+(A3)

EEP: Ethoxyethyl propionate

Water visc.: Water added for adjusting the viscosity

OH(SC)/NCO (mol): Ratio of the OH groups of the binder (sum of (A1)+(A2)+(A3)) to the NCO groups of the crosslinking agent

TABLE 2

Test results of permeability (100 micrometers x g x m$^{-2}$ x d$^{-1}$) to water vapor

|  | 40° C. |
| --- | --- |
| Comparative Ex. 1 | 121 |
| Example 1 | 61 |
| Example 2 | 68.8 |
| Example 3 | 63.5 |
| Comparative Ex. 2 | 74.5 |

TABLE 3

Test results of the mechanical properties

|  | Comp. 1 | Ex. 1 | Ex. 2 | Ex. 3 | Comp. 2 |
| --- | --- | --- | --- | --- | --- |
| Breaking force (N) | 5.4 | 6.7 | 8.4 | 7 | 8.7 |
| Elong. at break (%) | 19 | 20 | 22 | 13 | 9 |
| Elong. Fmax (%) | 10 | 8 | 5.5 | 5 | 4.5 |

Explanation of Tables 2 and 3:

The permeability to water vapor was determined on water-saturated foams at 40° C. using the carrier gas method.

Furthermore, characteristic values of the free films were determined in a ZWICK universal testing apparatus by subjecting them to a tensile/elongation test. The values given are the breaking force in N, the elongation at break in % and the elongation at Fmax in

What is claimed is:

1. An aqueous two-component polyurethane coating composition comprising
  (I) a component (I) comprising a binder (A) comprising
    (A1) at least one water-soluble or water-dispersible polyester resin comprising hydroxyl groups and acid groups which can be converted into the corresponding acid anion groups, wherein said resin has an OH number of from 30 to 250 mg of KOH/g and an acid number of from 5 to 150 mg of KOH/g,
    (A2) at least one water-soluble or water-dispersible polyurethane resin comprising hydroxyl groups and acid groups which can be converted into the corresponding acid anion groups, wherein said resin has an OH number of from 20 to 200 mg of KOH/g and an acid number of from 5 to 150 mg of KOH/g,
    (A3) a resin having an OH number of from 40 to 200 mg of KOH/g and an acid number of from 5 to 150 mg of KOH/g selected from the group consisting of at least one water-soluble or water-dispersible acrylate copolymer comprising hydroxyl groups and acid groups which can be converted into the corresponding acid anion groups, an acrylated polyester, an acrylated polyurethane, and mixtures thereof, and
    (A4) optionally, at least one further polymer, and
  (II) a component comprising a free polyisocyanate component (F1) as crosslinking agent, wherein the mixing ratio of the polyester resin (A1) to the polyurethane resin (A2) is between 95 parts by weight of polyester resin: 5 parts by weight of polyurethane resin and 5 parts by weight of polyester resin: 95 parts by weight of polyurethane resin.

2. The aqueous coating composition of claim 1, wherein the mixing ratio of polyester resin (A1) to polyurethane resin (A2) is between 90 parts by weight of polyester resin: 10 parts by weight of polyurethane resin and 30 parts by weight of polyester resin: 70 parts by weight of polyurethane resin.

3. The aqueous coating composition of claim 1, wherein the polyurethane resin (A2) is obtained by reacting in a first reaction step
  (a) at least one organic isocyanate selected from the group consisting of diisocyanates, polyisocyanates, and mixtures thereof, with
  (b) at least one compound comprising at least one group reactive with isocyanate groups and at least one group which ensures water dispersibility, to give a reaction product having free isocyanate groups which is then reacted with
  (c) a polycondensation product comprising
    (k1) 10 to 45 mol % of at least one diol,
    (k2) 5 to 50 mol % of at least one polyol having at least 3 OH groups per molecule,
    (k3) 35 to 47 mol % of at least one carboxylic acid selected from the group consisting of dicarboxylic acids, polycarboxylic acids, and mixtures thereof, and optionally one or more monocarboxylic acids,
    (k4) 0 to 20 mol % of at least one monool, the sum of the mol % of the components (k1) to (k4) being in each case 100 mol %, and
  (d) 0 to 20 mol %, relative to component (c), of at least one further alcohol component to give polyurethane resin (A2).

4. The coating composition of claim 1, wherein binder (A) comprises
  10 to 50% by weight of the mixture comprising at least one polyester (A1) and at least one polyurethane resin (A2),
  50 to 90% by weight of at least one resin (A3) and 0 to 10% by weight of at least one further polymer (A4),
the sum of the weight proportions of the components being in each case 100% by weight.

5. The coating composition of claim 1, wherein (A3) comprises an acrylate copolymer obtained by polymerizing
  (a1) a (meth)acrylate which is different from (a2), (a3), (a4), (a5), and (a6), copolymerizable with (a2), (a3), (a4), (a5), and (a6), and substantially free of acid groups or a mixture of such monomers,
  (a2) an ethylenically unsaturated monomer which is copolymerizable with (a1), (a3), (a4), (a5), and (a6), different from (a5), and carries at least one hydroxyl group per molecule and is substantially free of acid groups, or a mixture of such monomers,
  (a3) an ethylenically unsaturated monomer which carries, per molecule, at least one acid group and is copolymerizable with (a1), (a2), (a4), (a5), and (a6), or a mixture of such monomers, (a4) optionally, one or more vinyl esters of alpha-branched monocarboxylic acids having 5 to 18 carbon atoms per molecule, (a5) optionally, at least one member selected from the group consisting of the reaction product of an acid selected from the group consisting of acid, methacrylic acid, and mixtures thereof, with the glycidyl ester of an alpha-branched monocarboxylic acid having 5 to 18 carbon atoms per molecule, an equivalent amount of an acid selected from the group consisting of acrylic acid, methacrylic acid, and mixtures thereof, which is reacted, during or after the polymerization reaction, with the glycidyl ester of an alpha-branched monocarboxylic acid having 5 to 18 carbon atoms per molecule, (a6) optionally, an ethylenically unsaturated monomer which is copolymerizable with (a1), (a2), (a3), (a4) and (a5), is different from (a1), (a2), (a3), (a4), and (a5), and is substantially free of acid groups, or a mixture of such monomers, in one or more organic solvents in the presence of at least one polymerization initiator.

6. The coating composition of claim 1, wherein the polyester resin (A1) is obtained by reacting p1) one or more members selected from the group consisting of dicarboxylic acids, polycarboxylic acids, esterifiable derivatives thereof, and mixtures thereof, and optionally one or more monocarboxylic acids, p2) diols, p3) polyols, and optionally one or more monools, p4) optionally further modifying components.

7. The coating composition of claim 1, wherein the polyurethane resin (A2) is obtained by using one or more diisocyanates selected from the group consisting of diisocyanates of the general formula (III')

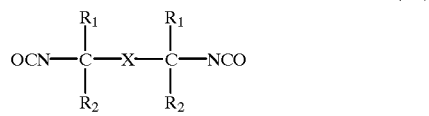

(III')

wherein x is a divalent aromatic hydrocarbon radical, and $R_1$ and $R_2$ are an alkyl radical having 1–4 carbon atoms, diisocyanates of the general formula (IV'):

(IV')

where R is a divalent alkyl or aralkyl radical having 3 to 20 carbon atoms and R' is a divalent alkyl or aralkyl radical having 1 to 20 carbon atoms, and mixtures thereof.

8. The coating composition of claim 1, wherein the binders (A1) through (A4) and the crosslinking agent (F1) are used in such amounts that the equivalent ratio of hydroxyl groups of components (A1) through (A4) of binder (A) to the isocyanate groups of the crosslinking agent (F 1) is between 1:2 and 2:1.

9. A process for preparing the coating composition of claim 1, comprising mixing the binder-containing component (I) and the crosslinking agent-containing component (II) before application of the coating composition.

10. A process of coating a substrate, comprising applying a coating composition of claim 1 to a substrate.

11. The process of claim 10, wherein the substrate is previously coated and the coating composition of claim 1 is a topcoat.

12. The aqueous coating composition of claim 2, wherein the mixing ratio of polyester resin (A1) to polyurethane resin (A2) is between 75 parts by weight of polyester resin: 25 parts by weight of polyurethane resin and 50 parts by weight of polyester resin: 50 parts by weight of polyurethane resin.

13. The aqueous coating composition of claim 3, wherein compound (b) comprises at least one group which ensures water dispersibility and is capable of forming anions.

14. The aqueous coating composition of claim 3, wherein component (k3) includes one monocarboxylic acid.

15. The coating composition of claim 4, wherein binder (A) has an OH number of from 50 to 200 mg of KOH/g.

16. The coating composition of claim 15, wherein binder (A) has an OH number of from 80 to 180 mg of KOH/g.

17. The coating composition of claim 6, wherein component p1) includes one or more monocarboxylic acids.

18. The coating composition of claim 6, wherein component p3) includes one or more monools.

19. The coating composition of claim 7, wherein x is a radical selected from the group consisting of an unsubstituted naphthylene, halo-substituted naphthylene, methyl-substituted naphthylene, methoxy-substituted naphthylene, diphenylene, 1,2-phenylene, 1,3-phenylene, and 1,4-phenylene.

20. The coating composition of claim 19 wherein x is a 1,3-phenylene radical.

21. The coating composition of claim 7, wherein $R_1$ and $R_2$ are a methyl radical.

22. The coating composition of claim 8, wherein the binders (A1) through (A4) and the crosslinking agent (F1) are used in such amounts that the equivalent ratio of hydroxyl groups of components (A1) through (A4) of binder (A) to the isocyanate groups of the crosslinking agent (F1) is between 1:1.2 and 1:1.5.

* * * * *